United States Patent [19]

Evans et al.

[11] Patent Number: 4,532,665
[45] Date of Patent: Aug. 6, 1985

[54] WHEEL RIM BUFFING DEVICE

[76] Inventors: Maurice L. Evans, 1401 Peninah; Clark M. Mola, 500 E. 21st St., both of Yankton, S. Dak. 57078; Richard D. Beringer, 417 N. Pearl, Tyndall, S. Dak. 57066

[21] Appl. No.: 593,645

[22] Filed: Mar. 26, 1984

[51] Int. Cl.³ .............................................. A46B 13/02
[52] U.S. Cl. .................... 15/21 D; 15/21 E; 51/104
[58] Field of Search ............ 15/21 B, 21 C, 21 D, 15/21 E, 97 R; 51/103 R, 104, 105 SR, 106 R, 236

[56] References Cited
U.S. PATENT DOCUMENTS

| 1,318,685 | 10/1919 | Morris | 51/104 X |
| 3,479,222 | 11/1969 | David et al. | 15/21 E |
| 3,797,058 | 3/1974 | Neal | 15/21 D |
| 3,953,942 | 5/1976 | Nisimura | 51/106 R |
| 4,217,733 | 8/1980 | Van Sickle | 15/21 D |

Primary Examiner—Edward L. Roberts

[57] ABSTRACT

A wheel rim buffing device including a three-point adjustable wheel support adjacent a buffing mechanism. The buffing mechanism includes a buffer wheel mounted so as to be movable towards and away from the rim and also axially across the rim and angularly relative to the surface of the rim so as to be able to buff the edge parts of the rim as well as its base. The wheel support is mechanically driven to rotate the rim adjacent the buffer.

10 Claims, 5 Drawing Figures

WHEEL RIM BUFFING DEVICE

BACKGROUND AND SUMMARY OF THE INVENTION

This invention pertains to wheel rim buffers and more particularly to a buffer adapted to be adjustable to many sizes of rims and having a flexibly movable buffer wheel adapted to reach all inner parts of the rim.

Older wheel rims on which pneumatic tires are to be mounted frequently become rusty and corroded. This corrosion leads to deterioration of the rim, and especially for tubeless tires can cause slow leaks of air from the tire because of imperfect sealing of the tire bead on the rim. The corrosion can also cause rough spots on the rim which will chafe tubes which may be used on certain tires, thus considerably shortening the life of the tube. Therefore it is desirable to eliminate that corrosion whenever possible.

Our previous U.S. Pat. No. 4,426,747 issued Jan. 24, 1984 illustrates one type of device for buffing such rims. However, that device, while well adapted to its use on relatively uniformly sized rims is not flexible enough to be used with both small auto rims and large truck rims. That device also requires a clumsy attachment of a wheel to a spindle in order to hold the rim in place for buffing.

The present device is designed to be considerably more flexible as to the size of the rims it can handle and more convenient in the placing of rims on the machine. It also requires less time for attachment of the rim to the holding device which causes that rim to rotate. Another advantage of the present device may be that it is somewhat easier to control the position of the buffer wheel relative to the rim being cleaned.

FIGURES

DESCRIPTION

Figure 1:
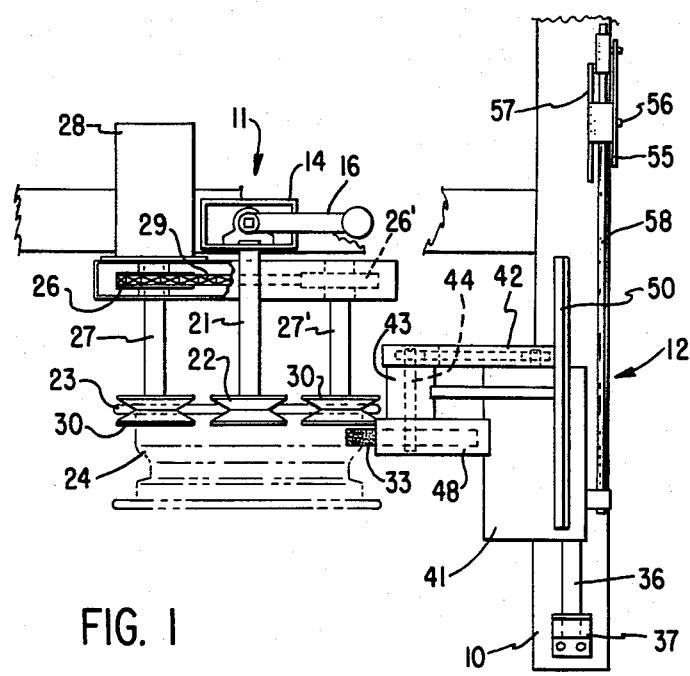
FIG. 1 is a top plan view of the device.
Figure 2:
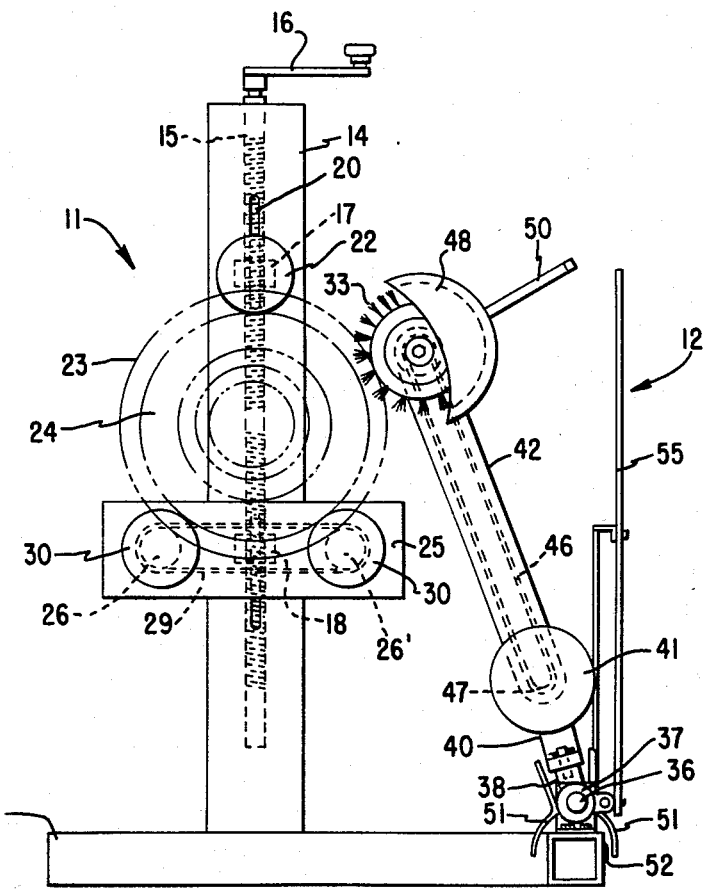
FIG. 2 is a front elevational view of the device showing a relatively small rim in place.
Figure 3:
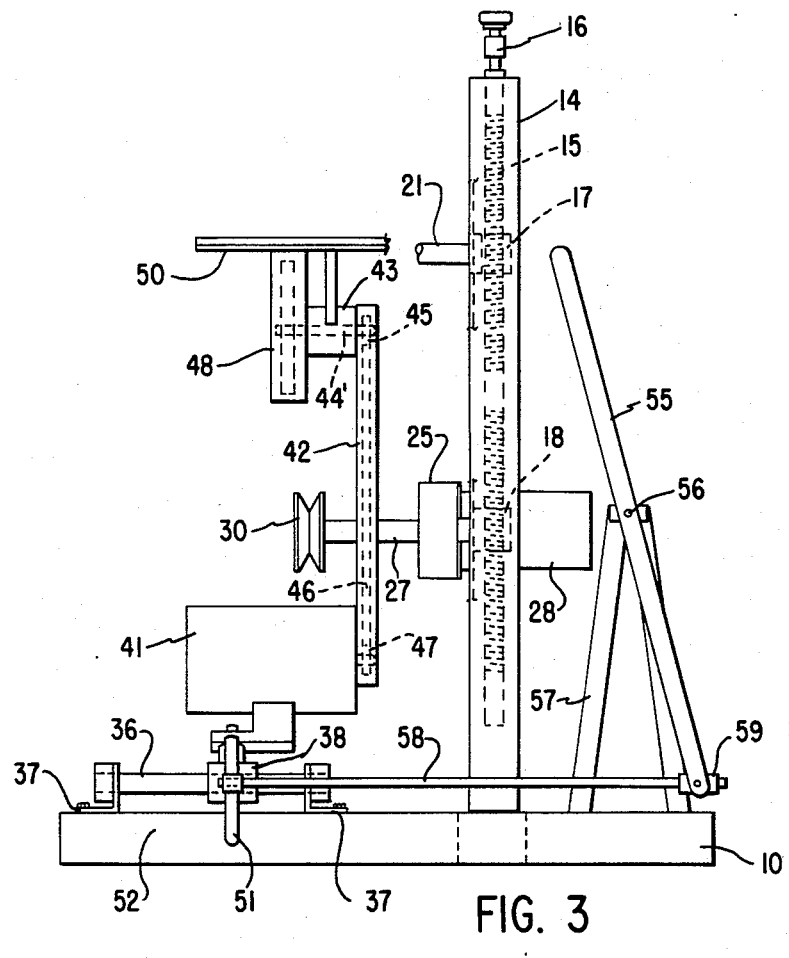
FIG. 3 is a side elevational view of the device with no rim being in the holder.
Figure 4:
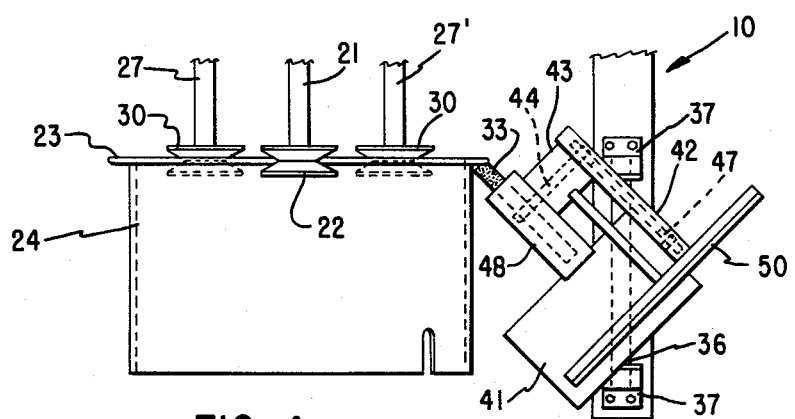
FIG. 4 is a partial top view of the device showing a large rim in place and the buffer cleaning the bead-holding ridge on the rim.

Briefly, our invention comprises improvements in the device covered by my previous patent noted above. The improvements are principally in the way the rim is supported and the way motion of the buffer wheel is accomplished.

More specifically, and referring to the drawings, the present device is intended to rest on the ground or floor. For that purpose, we provide a base 10 although it would be possible to bolt the parts directly to a floor. On the base we mount a rim holding mechanism 11 and a buffer wheel assembly 12.

The rim holding device 11 is supported by a column 14 which is preferably hollow. Within the hollow interior of the column, a screwthreaded shaft 15 is journalled. A crank 16 fixed to the upper end of the shaft 15 is adapted to drive the shaft. It will be obvious that power means such as an electric, pneumatic or hydraulic motor could also be used to drive the shaft 15 and its attached parts if desired.

The upper and lower parts of the shaft are provided with screw threads of opposite hands. Alternate threaded bushings 17 and 18 are threaded onto the shaft 15, and are disposed behind slot 20. These bushings may include a sliding block adapted to slide within the column 14. The upper bushing 17 carries a shaft 21 on which may be journalled an idler pully or sheave wheel 22. This wheel is adapted to engage a flange 23 on a wheel or rim 24.

The lower bushing 18 carries a housing 25. This housing encloses a pair of pulleys 26 and 26' fixed on shafts 27 and 27'. The shaft 27 is driven by a geared motor 8 and the motion of that shaft is transmitted through the pulleys 26 and 26' and a belt 29 to the shaft 27'. A sheave 30 similar to sheave wheel 22 is carried by each of the shafts 27 and 27'.

It will now be apparent that by turning the threaded shaft the spacing between the sheave 22 and the sheaves 30 can be varied to accomodate a large number of different sizes of rim or wheel, and still to be able to hold the wheel firmly. Regardless of the size of the rim, the linear speed of the surface of the rim past the buffing wheel brush 33 will be controlled only by the speed of the motor 28. For any given setting of that speed, the rim will be driven by the sheaves 30 at a substantially uniform speed regardless of the diameter of the rim. This would not be true of a device in which the rim was rotated at a constant rotational speed by a motor driving a central axle on which might be mounted.

The actual buffing of the rim of the wheel 24 is accomplished by the buffer wheel assembly 12 which is also mounted on the base 10. In the embodiment shown, I illustrate a wheel 33 including a wire-brush. However, I envision that other types of buffer wheels could be used without departing from the scope of the invention. In order to provide for motion of the buffer wheel 33 both radially toward and away from the rim and axially of the wheel, we provide a slide bar 36 mounted by means of brackets 37 on the base 10. A mounting member 38 is slidably journalled on the bar 36. This allows sliding movement of the member 38 along the bar 36 as well as pivoted movement around the bar.

A motor mounting bracket 40 is pivotally mounted on the member 38. The pivot axis of the mounting is substantially perpendicular to the axis of the bar 36 so that anything mounted on this mounting bracket can be pivotally moved about both axes.

A drive motor 41 is mounted on the bracket 40 and in turn supports a pillar housing 42. At its upper end, the housing supports a bushing 43 in which is journalled a shaft 44. This shaft 44 is driven through a pulley 45 on the shaft and a belt 46 within the housing 42 by the motor 41 and its pulley 47. The shaft 44 carries the buffer wheel 33 and drives it to provide the desired buffing action on the rim. A guard 48 is provided over the wheel 33 to protect the operation.

Two control means are provided to allow the operator to control the motion and position of the wheel 33 relative to the work. The first is simply a handle 50 mounted on the bushing 43. This handle may be T-shaped as shown to to provide a more convenient hand hold for the operator. This control is used primarily to move the wheel 33 toward and away from the work, i.e. essentially radially of the wheel 24 and pivotally about the axis of the bar 36. It is also used to rotate the motor 41 and the parts attached thereto about the pivoted axis between the mounting member 38 and the mounting bracket 40. This movement allows the buffer wheel 33 to be tilted relative to the work so that it will buff the flanges 23 of the rim as well as the flat cylindrical parts.

The tilting motion about the axis of the bar 36 is limited by stop members 51 on the mounting member 38. These stops 51 are formed to embrace the raised portion 52 of the base, and thus will stop movement beyond the point at which they come into contact with the sides of that raised portion.

The second control is for motion axially of the bar 36. Because that axis is substantially parallel to the axis of the wheel 24, the control is for motion across the rim being cleaned. This control includes a lever 55 pivoted at 56 to a support 57 mounted on the base 10. The upper part of the lever 55 is adapted to be used as a handle. The lower end is pivotally attached to a rod 58 through a collar 59. By these means the position of the rod 58 in relation to the lever 55 can be adjusted.

At its other end, the rod 58 is attached to the mounting member 38 so that longitudinal movement of the rod 58 caused by the movement of the lever 55 will move the assembly including the buffing wheel 33 across the rim of the wheel 24. The rod 58 is flexible enough so that the small tilting of the member 38 causes no problem to the operation of the device.

The operation of the device should be clear from the description. At first the crank 16 is used to widen the space between the sheave wheels 30 on the bottom and wheel 22 on top. When the space is wide enough to receive the rim between the sheaves, the wheel 24 or rim to be buffed is placed on the lower wheels, and the crank again used to bring the wheels together to clamp the rim between those wheels. The motor 28 can then be started to drive the wheel 24 in a slow rotating motion.

The motor 41 is then started to drive the buffer 33. By using the handles 50, the buffer can be pushed against the rim and, by angular rotation, turned against the flanges. Also, the lever 55 can be used to move the buffer back and forth across the rim face to buff out all the rust and other undesired material.

Figure 5:
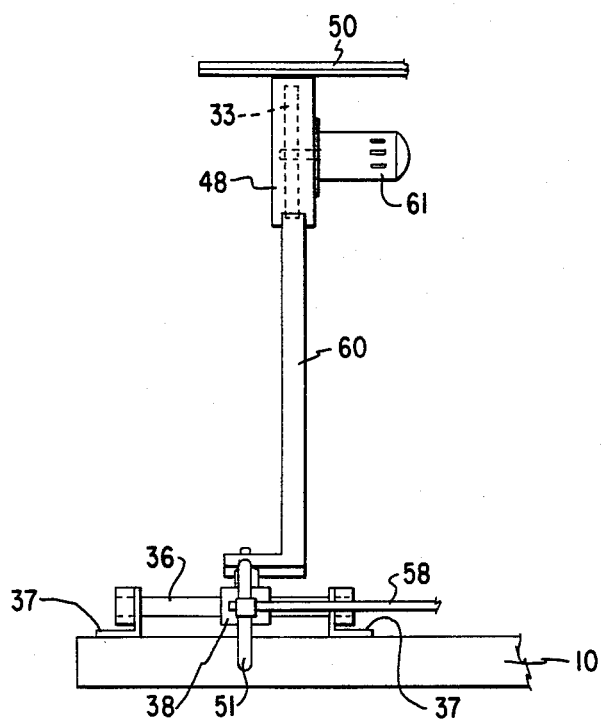
FIG. 5 is a partial side elevational view showing an alternative brush device.

An alternative buffer wheel assembly is shown in FIG. 5. This device uses a direct drive on the buffer wheel. The same rod 36 and brackets 37 on the base 10 are used, and the mounting member 38 is virtually the same as in the previously described device. However, rather than mount the motor 41 on the pivoting part of the member 38, we use a buffer wheel column 60 which pivots in the same way as the motor 41 and housing 42 of the previous devices. A motor 61 adapted to drive the buffer wheel 33 directly can then be used in place of the belt drive. The shield 48 and handle 50 may be the same as in the previously described device. We do not believe that any counter weight of the weight of the motor will be necessary, but if the weight on the handle 50 is greater than desired, we believe it well within the capability of me one skilled in the art to provide counter weights either as weights or by springs to relieve the load on the handle.

We claim as our invention:

1. Rim buffing means comprising a base, rim holding means mounted on said base, said rim holding means including a substantially vertical column, at least two sheave means slidably mounted on said column, means to move said sheave means slidably toward and away from each other, said sheave means adapted to engage and hold a rim, drive means adapted to drive at least one of said sheave means to cause said rim to rotate, and buffer means on said base adjacent said rim holding means and including a driven buffer wheel adapted to engage said rim to clean it.

2. The device of claim in which said means to move said sheave means includes a shaft being threaded on one part with right-hand threads and on another part with left-hand thread, one of said two sheave means being threadably engaged with the right-hand threads and the second part with said left hand threads whereby rotation of said shaft moves said sheave means in opposite directions.

3. The device of claim 1 in which the first sheave means includes a single idler sheave wheel and the second sheave means includes a pair of spaced apart sheave wheels forming the vertices of a triangle with said idler wheel.

4. The device of claim 3 in which said pair of wheels are connected to said drive means and are driven thereby.

5. The device of claim 2 in which means is connected to said shaft to rotate it and thereby cause movement of said sheave means.

6. For a rim having at least one flange buffing means comprising a base, rim holding means mounted on said base and adapted to move a rim rotatably in a plane substantially perpendicular to said base, buffer wheel assembly means on said base adjacent said rim holding means and including support means, a driven buffing wheel mounted on said support means in position in contact said rim, said support means being slidably mounted on said base for slidable movement in a direction substantially axially of said rim and also tiltable radially toward and away from said rim and also pivotally mounted on an axis substantially perpendicular to the tilting axis so that the perimeter of said wheel is turned toward the flange on said rim so as to be in position to buff the inside of said flange.

7. The device of claim 6 in which said support means includes a mounting member slidably and tiltably mounted relative to said base and a mounting bracket pivotally attached to said mounting member, motor means mounted on said mounting bracket and in driving relationship to said buffing wheel.

8. The device of claim 7 in which said driving relationship is effected by means of belt means between said motor means and an axle for said buffing wheel.

9. The device of claim 7 in which said driving relationship is effected by a motor in direct driving relationship to said buffing wheel.

10. The device of claim 7 in which said mounting member includes stop members extending from said mounting member to embrace a portion of said base whereby the tilting movement of said mounting member and therefore of the support means is limited.

* * * * *